J. W. OFFUTT.
SAW GUARD.
APPLICATION FILED AUG. 31, 1911.

1,072,401.

Patented Sept. 2, 1913.
2 SHEETS—SHEET 1.

WITNESSES
Chas. Fosterman
R. D. Little

INVENTOR
John W. Offutt
by Linthicum Belt & Fuller
his Attorneys

J. W. OFFUTT.
SAW GUARD.
APPLICATION FILED AUG. 31, 1911.
1,072,401.
Patented Sept. 2, 1913.
2 SHEETS—SHEET 2.
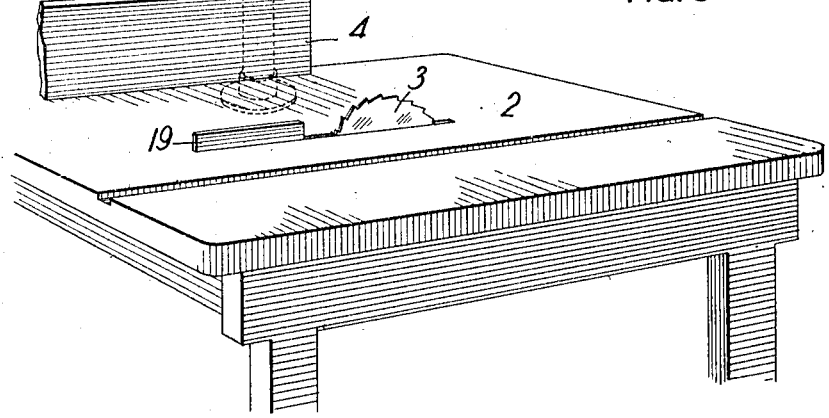
FIG. 3
FIG. 4
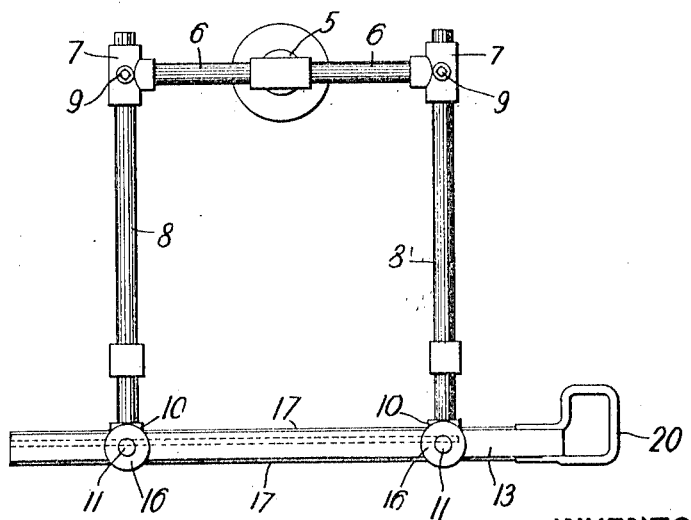
WITNESSES
Chas. Josterman
R. S. Little
INVENTOR
John W. Offutt
by Linthicum Belt & Fuller
his attorneys

UNITED STATES PATENT OFFICE.

JOHN W. OFFUTT, OF ELLWOOD CITY, PENNSYLVANIA.

SAW-GUARD.

1,072,401.   Specification of Letters Patent.   Patented Sept. 2, 1913.

Application filed August 31, 1911. Serial No. 646,980.

*To all whom it may concern:*

Be it known that I, JOHN W. OFFUTT, a citizen of the United States, residing at Ellwood City, in the county of Lawrence, State of Pennsylvania, have invented certain new and useful Improvements in Saw-Guards, of which the following is a specification.

My invention relates to safety appliances for high speed circular saws employed in cutting wood and to the mechanism employed in securing the safety appliances in position upon the saw table of a circular saw.

One object of the invention is to provide a saw guard having novel means whereby the portion of the saw projecting above the saw table is protected at all times and any thickness of material may be sawed without adjustment of the guard, and by the use of which the operative is fully protected from splinters and flying particles of saw dust at all times, and another object of my invention is to provide a saw guard having means whereby the necessity of pushing materials past the saw by hand is avoided and liability of injury to the operative thereby overcome.

A further object of the invention is to provide a saw guard having means for holding the materials being sawed on the saw table and preventing such materials from lifting and "kicking back" after passing the saw, and a still further object of the invention is to provide a saw guard having improved means whereby the saw guard is secured in place upon the saw table and is maintained in alinement with the saw during the cutting operations of the saw.

Figure 1:
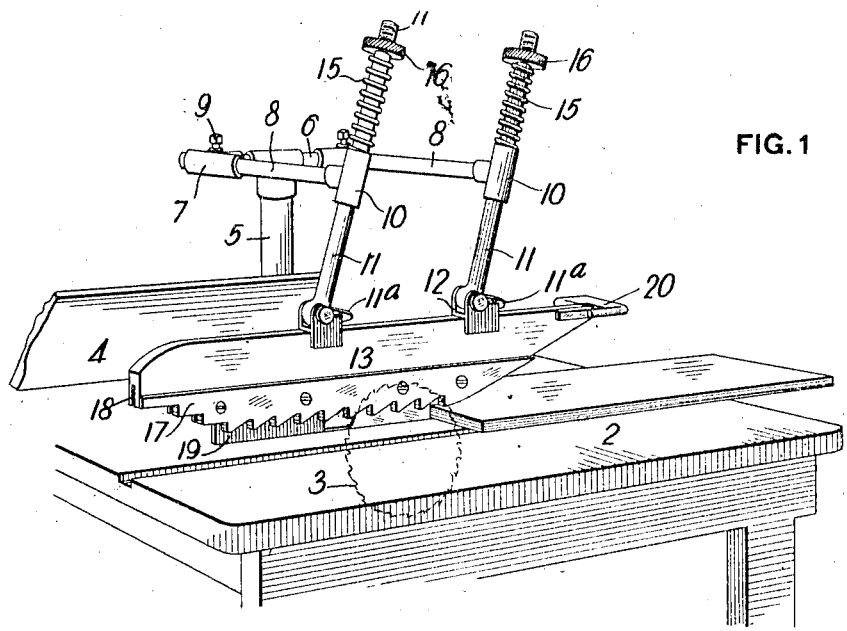
Figure 2:
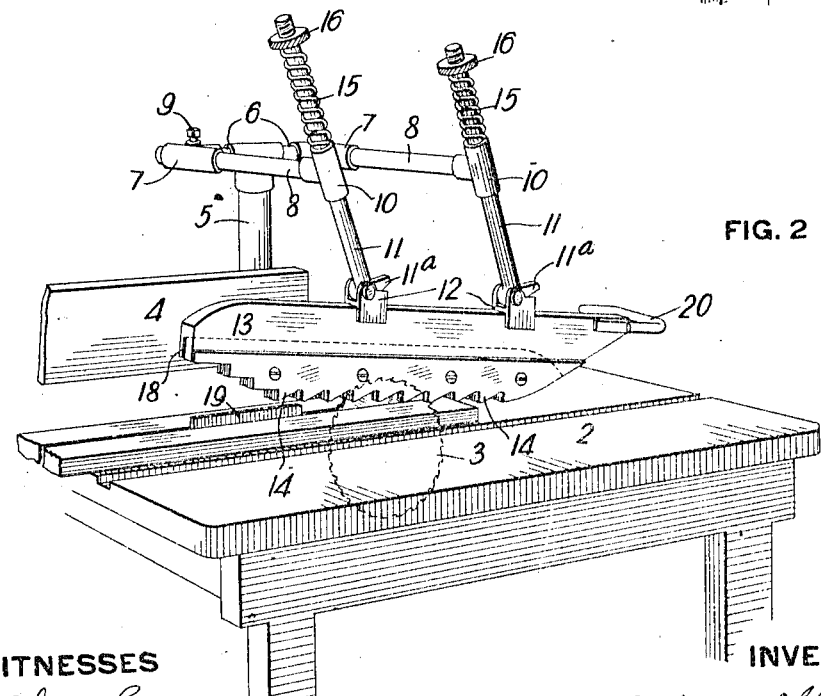

Referring to the accompanying drawings forming part of this specification Figure 1 is a perspective view showing the construction and arrangement of a saw guard as applied for use on the saw table of a circular saw. Fig. 2 is a similar perspective view showing the saw guard in another or later one of its operative positions on the saw table. Fig. 3 is a perspective view showing the saw guard of Figs. 1 and 2 thrown backwardly in the inoperative position in which it is placed when changing the saws or in making other necessary changes or adjustments in the sawing mechanism. Fig. 4 is a plan of the apparatus shown in the preceding figures.

In the accompanying drawings 2 designates a saw table having a circular saw 3 operatively mounted thereon which is adapted to be raised or lifted varying distances above the face of the saw table in cutting materials of varying thicknesses. A guide 4 of the usual construction is detachably secured on the top of the saw table 2 so as to be adjustable toward and away from the saw in varying the width to which the material being sawed is cut.

Rigidly secured on one side of the saw table 2 so as to extend vertically is a post or standard 5 having a horizontal cross arm 6 extending lengthwise above the saw table in a direction parallel with the guide 4 and at right angles to the saw's axis of rotation. T's 7 are fastened to the ends of the cross arm 6 to provide stationary bearings or slides in which the horizontally extending supporting arms 8 are adjustably secured. The arms 8, which are arranged to extend parallel with each other and with the saw arbor or axis of rotation of the saw 3 are adjustable lengthwise in the bearings 7 to permit the saw guard to be adjusted sidewise with relation to the saw and are held in adjusted position by the set screws 9.

The outer ends of the horizontal arms 8, 8, have supports or bearings 10 swiveled thereto so as to rock or rotate each about the axial center of the arm to which it is secured. Supporting rods 11 extend through the swivel bearing 10.

The lower ends of the supports 11 are pivoted to the hinge plates 12 on the upper edge of the saw guard 13 and a projection or foot 11ᵃ on the lower end of the vertical supports 11 is provided to limit the forward movement of the saw guard and prevent the saw 3 being uncovered in operating the guard.

The lower edge of the saw guard 13 is provided with serrations or teeth 14 which are adapted to engage with and hold the material being sawed in position against vertical movement on the saw table while being cut in the beginning of the sawing operations and the teeth 14 are also arranged to engage with the rear end of the board or material being cut in pushing the material entirely past and away from the saw.

The supports 11 are yieldingly suspended from the swiveled bearings 10, helical springs 15 being placed on the supports 11 and a knurled adjusting nut 16 being provided on the screw threaded upper end of the vertical supports to regulate the compression on the springs. By this construction the saw guard 13 is yieldingly held in engagement with the top surface of the materials being cut and, being lengthwise movable will engage with materials of any thickness within the capacity of the saw.

The saw guard 13 preferably is made of hard wood and hinge plates or connections 12 are fastened to the upper edge thereof by which the lower end of the supports 11 are pivotally attached to the saw guard.

A metal wearing plate 17 is secured on the vertical sides or faces of the wooden saw guard and the slot or recess 18 is formed in the lower edge of the guard into which the saw 3 extends when materials to be cut on the saw table are being moved by means of the saw guard 13.

To prevent the saw guard 13 moving out of alinement in its path of movement a stationary guide plate 19 of a thickness the same or slightly less than the width of the recess 18 in the saw guard is rigidly secured to the saw table 2 so as to project above the face of this table in the rear of the saw, and form a guide which will maintain the saw guard in its vertical position and cause it to travel backward and forward over the saw in parallel lines and not contact with the rapidly revolving saw.

When it is desired to adjust the saw or to replace any one saw with another, the saw guard 12 is pulled backwardly by means of a handle 20 secured at one end thereof, until the saw guard supports 11 are practically in horizontal alinement, this movement lifting the saw guard into the position shown in Fig. 3. When the saw guard is moved into this position by reason of the supports 11 being in horizontal alinement in the swiveled bearings 10 the saw guard 12 can be swung about the then horizontal axis of these supports 11 and swiveled bearings, backwardly out of the way, at the rear of the swivel bearings 10. A handle 20 is provided in the rear end of the guard 13 by which the saw guard is manipulated.

The operation of the apparatus is as follows: When the material to be sawed is first pushed under the saw guard 13, the guard is lifted and assumes the position shown in Fig. 1 the guard swinging forwardly until the feet or projections 11$^a$ on the supports 11 strike the hinge plates 12 on the top edge of the saw guard. The springs 15 at this time exert a force tending to lift the guard 13. When the rear end of the material being sawed advances until within four to six inches of the saw, the material until now having been grasped and fed forwardly by the operative, the operative grasps the handle 20 on the rear end of the guard and swings it backwardly. In swinging the guard backwardly it is also pressed downwardly until one or another of the teeth 14 in the serrated lower edge of the guard is in engagement with the rear end of the piece of material. The guard 13 is then moved forwardly by means of the handle 20 and, being in engagement with the rear end of the material being sawed, as is shown in Fig. 2, pushes the material forwardly as far as the limiting feet 11$^a$ on the supports 11 will permit. The guard is then moved backwardly while being pressed downwardly and again forwardly by means of the handle 20 as often as necessary to push the material being sawed entirely past the saw 3. The above described operations are then repeated upon successive pieces of the materials being cut.

When it is desired to remove the saw from its arbor or adjust the saw vertically relative to the top of the saw table, the operative grasps the handle 20 and moves the saw guard backwardly, this movement also lifting the saw guard until the supports 11 and swivel bearings 10 are swung into substantially the same horizontal plane, (as is shown in Fig. 3). When moved into this position the saw guard 13 is then moved about the then common horizontal axis of the swivel bearings 10 and supports 11 until in the position shown in Fig. 3, which is entirely clear of the saw and out of the way of the operative in making adjustments to or changing the saw on its arbor.

The advantages of my invention will be apparent to those skilled in the art.

By the employment of a saw guard constructed in accordance with my invention the saw is covered at all times in cutting materials of any thickness that can be cut by the saw. The necessity of pushing the end of the sawed materials past the saw by hand is entirely overcome and prevented so that injury to the operative is practically impossible.

The saw guard is readily removed from its operative position out of the way of the operative when making changes in or adjustments to the saw mechanism.

Modifications in the construction and arrangement of the parts may be made without departing from my invention.

Instead of using a single standard, as shown, separate standards may be employed for supporting the adjustable horizontal rods forming part of the apparatus, and other changes may be made.

I claim:—

1. A saw guard comprising a saw cover arranged to swing lengthwise above the saw, swinging arms to which the cover is pivotally secured, and means on which the swinging arms are pivotally mounted, the swinging arms being independently movable vertically on said means while the saw cover is being operated.

2. A saw guard comprising a saw cover having a recess in the lower edge thereof into which the saw extends and arranged to swing lengthwise above the saw, swinging arms to which the cover is pivotally secured, and means on which the swinging arms are pivotally mounted, said arms being yieldingly held to permit independent adjustment vertically.

3. A saw guard comprising a saw cover having a recess in the lower ends thereof into which the saw extends and arranged to swing lengthwise, swinging arms to which the cover is pivotally secured, means on which the swinging arms are pivotally mounted, said arms being independently adjustable vertically while the saw cover is being operated, and means on the swinging arms engaging with the cover to limit the forward lengthwise movement of the cover.

4. A saw guard comprising a lengthwise swinging saw cover having a recess in the lower edge thereof into which the saw extends, swinging arms to which the cover is pivotally secured, and means on which the swinging arms are pivotally mounted, said swinging arms being independently movable vertically during the operation of the saw cover to permit raising and lowering of one end of the cover independently of the other.

5. A saw guard comprising a saw cover having a series of notches or serrations on its lower edge, a groove or recess extending lengthwise in said notched edge of the cover into which the saw extends and means supporting said cover above the saw arranged to swing the cover lengthwise, said supporting means arranged to permit rocking of the cover to raise and lower one end thereof relative to the other to bring the notches in the cover into engagement with the rear end of the materials being cut by the saw.

6. A saw guard comprising a lengthwise movable saw cover, means for supporting said cover above the saw, said supporting means having swinging arms independently movable vertically while the saw cover is being operated and arranged to permit lengthwise and vertical movement of the saw cover in a straight and also a curved path, said means being adapted to guide the cover in a path parallel to the sides of the saw.

7. A saw guard comprising a lengthwise movable saw cover having a recess or groove on the lower edge thereof into which the saw extends, means for supporting said cover above the saw, said supporting means having swinging arms independently movable vertically and arranged to permit lengthwise and vertical movement of the saw cover, and means for guiding the cover in a path parallel to the sides of the saw.

8. A saw guard comprising a lengthwise and vertically movable saw cover having a longitudinally extending recess or groove in its lower edge into which the saw extends, arms to which the cover is pivoted and pivoted supports on which the arms are mounted so as to move vertically with the cover, said arms and pivoted arm supports being arranged to swing backwardly into substantially horizontal axial alinement and thereby permit axial movement of the arms in the arm supports to move the cover into inoperative position.

In testimony whereof, I have hereunto set my hand.

JOHN W. OFFUTT.

Witnesses:
Geo. L. Schreiber,
M. E. Nolan.